June 25, 1957
C. H. WOODWORTH
2,796,642
RIGID ARCH JOINER
Filed Sept. 27, 1954
2 Sheets-Sheet 1
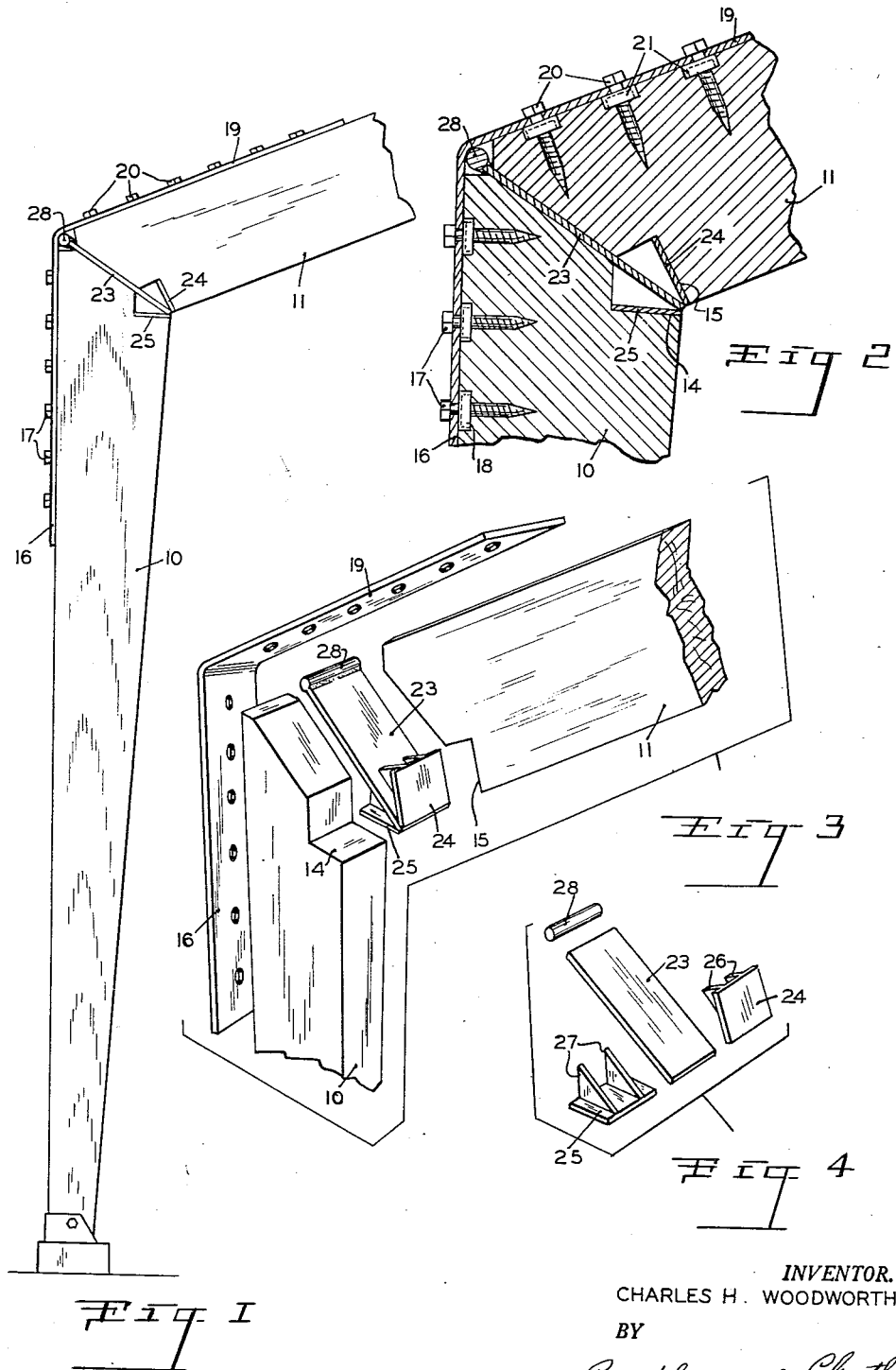
INVENTOR.
CHARLES H. WOODWORTH
BY
Buckhorn and Cheatham
ATTORNEYS June 25, 1957     C. H. WOODWORTH     2,796,642
RIGID ARCH JOINER
Filed Sept. 27, 1954     2 Sheets-Sheet 2
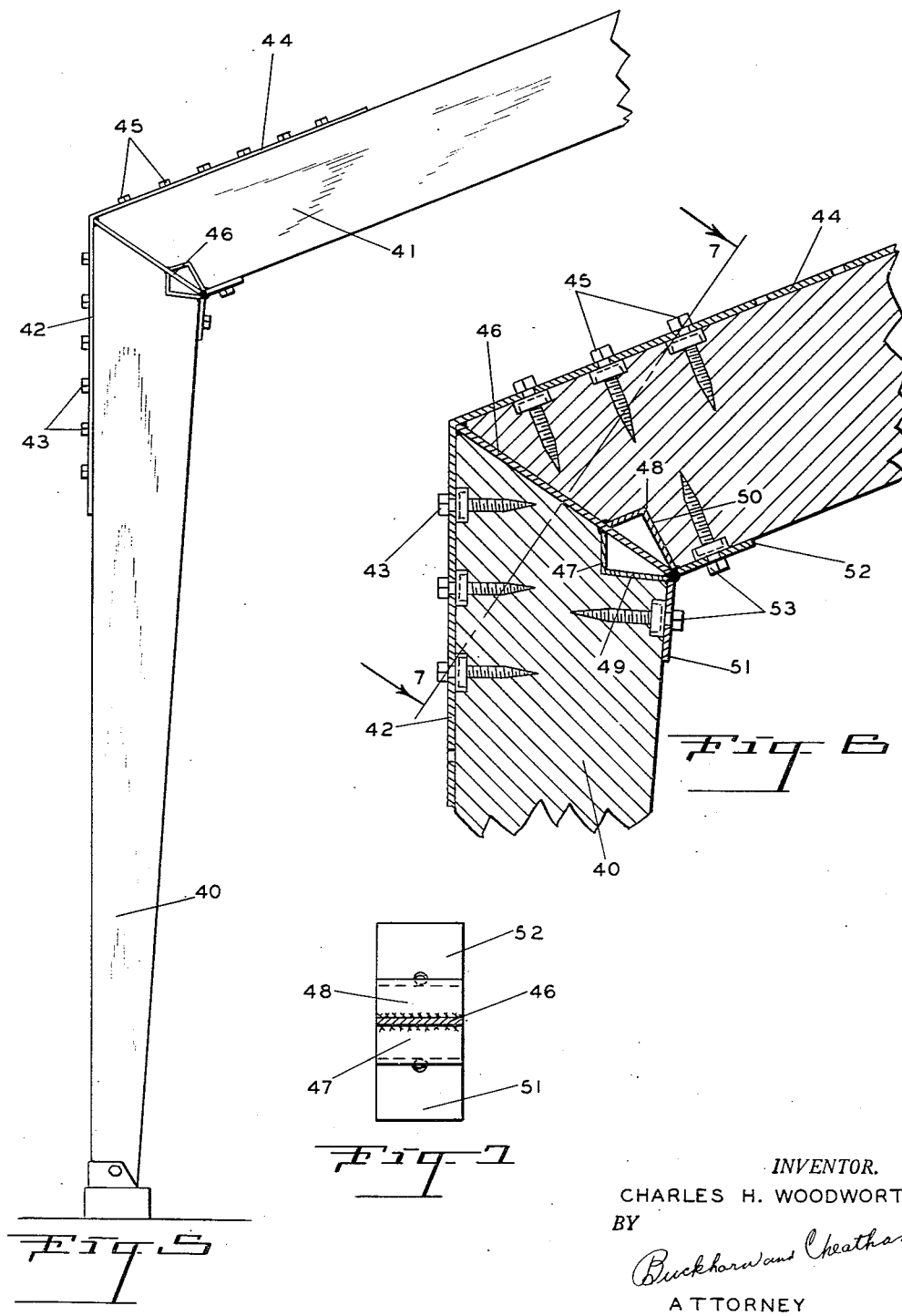
INVENTOR.
CHARLES H. WOODWORTH
BY
Buckhorn and Cheatham
ATTORNEY

United States Patent Office 2,796,642
Patented June 25, 1957

2,796,642
RIGID ARCH JOINER

Charles H. Woodworth, Portland, Oreg., assignor to Timber Structures, Inc., Portland, Oreg., a corporation of Oregon Application September 27, 1954, Serial No. 458,396

6 Claims. (Cl. 20—92)

My present invention relates to timber arches, particularly timber arches of large size which may be formed of unitary wooden beams or of laminated wooden beams composed of a plurality of smaller beams or planks glued together in face-to-face relation. Such beams may weigh several tons, and may span distances of fifty feet or more. A principal object of the present invention is to provide an arch joint for joining the upright posts of the arch to a lateral beam, or beams, in a manner permitting field assembly of the arch without the use of special equipment.

An object of the present invention is to provide arch joint connecting means which may be positioned and connected to the wooden members of the arch while the wooden members are lying on the ground in abutted relation to each other in the relative positions they occupy when the arch is completed and in upright condition. Certain prior art connectors devised for this purpose have depended in part upon the positioning of longitudinally extending gussets in longitudinally extending slots in opposed portions of the end surfaces of the post and of the beam. Since such connectors also comprised parts which lie against the side surfaces of the wooden members it was an extremely difficult matter to fit the connector to the arch. The connector first had to be engaged in the slots in one of the wooden members, then the other wooden member maneuvered into position so as to engage the gussets in the slots in it. The present invention comprises a connector, all parts of which are so arranged that the connector may be slid into position from above the abutted ends of the post and beam when lying flat on the ground in the position they occupy in use, thereby eliminating the necessity for manipulating one or the other of the heavy wooden members while the connecting operation is taking place.

A further object of the present invention is to provide a connector of the character described which may be used to join together posts and beams having their ends precut to certain definite angular relationships with each other, thereby eliminating the necessity of shaping the ends of the post and the beam in the field.

A further object of the present invention is to provide a connector characterized by having angularly disposed compression plates for absorbing the compression load of the arch, which compression plates lie in planes substantially at right angles to the grain of the wood, thereby eliminating any tendency for the mitered end surfaces of the arch to collapse due to the wood being compressed and crushed progressively outwardly from the inner angle of the mitered joint. The compression strength of wood is greatest in the direction of the grain thereof, and the present invention takes advantage of this fact by having the portions of the arch which carry the compression load rest against compression absorbing plates extending transversely to the longitudinal axes of the wooden members.

One form of the invention comprises a pair of separable members, one of which is positioned between the abutted ends of the wooden members and the other of which is positioned against the exterior surfaces of the wooden members on each side of the mitered ends thereof. The principal object of this form of the invention is to provide a connector which may be most readily placed in position, and which will absorb the loads imposed thereon regardless of any slight deviation from accurate angular relationship of the surfaces of the wooden members.

Further objects and advantages of the present invention will be more apparent from inspection of the following specification taken in connection with the accompanying drawings wherein like numerals refer to like parts throughout.

In the drawing,

Fig. 1 is a partial side view, in elevation, of an arch including a preferred form of the connector of the present invention;

Fig. 2 is a vertical section, on an enlarged scale, through the joint illustrated in Fig. 1;

Fig. 3 is an exploded view, in perspective, showing the adjacent ends of the wooden members and the parts of the separable form of the present invention illustrated in Figs. 1 and 2;

Fig. 4 is an exploded view, in perspective, of parts of one of the members of the joint prior to welding together;

Fig. 5 is a partial side view, in elevation, of an arch including a modified form of connector;

Fig. 6 is an enlarged, vertical section through the arch joint of Fig. 5; and

Fig. 7 is a sectional view taken substantially along line 7—7 of the connector removed from the arch in Fig. 6.

In Figs. 1 to 4, inclusive, there is illustrated an arch comprising an upright post 10 and a laterally extending beam 11, the beam extending from the top of the post with the lower surface thereof defining an inner, dihedral angle with the inner surface of the post. The beam and the post are wooden members which may be unitary timbers, but are more likely formed of a plurality of individual timbers or planks adhered together along their broad surfaces to form laminated wooden members. In either form the longitudinal grain of the wood is substantially parallel to the longitudinal axes of the wooden members. The adjacent end surfaces of the post and beam in the compression area thereof, close to the inner surfaces of the wooden members, diverge outwardly to define an outer, dihedral angle therebetween, the end surfaces being substantially transverse to the grain of the wood. Any angle within the range of about seventy degrees to about forty-five degrees is suitable for the present invention, but it is preferred that the angle defined by the end surface 14 of the post and the end surface 15 of the beam be approximately sixty degrees. While this arrangement may cause such end surfaces to be slightly inclined with respect to the transverse axes of the wooden members, nevertheless they are substantially transverse to the longitudinal axes of the post and beam and substantially transverse with respect to the grain of the wood.

In accordance with the present invention the post and beam are held together by means of an outer, continuous, tension strap including an upright portion 16 lying against the outer surface of the post and affixed thereto by suitable means such as lag screws 17 and ring-type shear plates 18. The connector also comprises a laterally extending portion 19 lying along the upper surface of the beam and affixed thereto by lag screws 20 and similar shear plates 21. The tension strap comprises a single strap, the bend between the two portions 16 and 19 being rounded about a relatively small radius as illustrated.

The joint comprises a separate compression member which is placed between the end surfaces of the wooden members. This compression member comprises a pressure pad plate 23 and a pair of compression absorbing plates 24 and 25 so arranged that the plate 23 bisects the angle between the plates 24 and 25. A pair of gussets 26, and a pair of gussets 27, respectively connect the plates 24 and 25 to the plate 23 and brace them in position. The inner edges of the gussets extend substantially along the grain and parallel to the axes of the wooden members so that the compression thrust is taken up by the rigid metal structure. The compressive forces are thus absorbed by metal plates extending at right angles to the grain of the wood, thus eliminating the tendency of the wooden members to start crushing at the inner dihedral angle and progressively crush outwardly.

A short, round bar 28 is welded to the outer edge of the compression plate 23, the bar having a radius slightly smaller than, or equal to, the radius of the bend of the tension strap. The outer edges of the end surfaces of the wooden members are chamfered to provide an angular space in which the bar 28 is freely received. Thus the two members may be placed in the positions they would occupy when the wooden members lie on the ground, and still be free to shift slightly with respect to each other as the arches are positioned upright subsequent to being joined, and as the load varies thereon. This eliminates any tendency for unbalanced stresses to be imposed on the member such as might be occasioned if the compression portion of the joint were rigidly affixed to the tension portion of the joint. Strains are thus equalized throughout the construction regardless of the accuracy of formation of the joint, or unusual shifting of the members as the loading varies. The compressive forces which tend to push the plate 23 outwardly are resisted by the holding effect of the tension strap. It is to be appreciated that even though there are two separable members forming the metal connector, nevertheless the two members act together as a unit to retain the wooden members and absorb the loading forces thereon.

The form of the invention illustrated in Figs. 5 to 7, inclusive, comprises substantially the same construction in a form which may be more suitable for smaller arches. In this construction a post 40 is united to a lateral beam 41 by a connector comprising an outer, continuous, tension strap including the upright portion 42 held to the outer surface of the post by lag screws 43 or the like, and the lateral portion 44 held to the upper surface of the beam by lag screws 45 or the like. The portions 42 and 44 define an obtuse angle therebetween, the angle being substantially subdivided by a plate 46 welded into the apex thereof and extending between the adjacent end surfaces of the post and beam. The inner end of the plate 46 has a pair of angle bars 47 and 48 welded thereto on the opposite surfaces thereof, the angle bars being welded to the plate along the outer edges of their legs. The angle bars thus define compression plates 49 and 50 which lie in planes transverse to the grain of the wood and extend outwardly and upwardly, respectively, from the inner dihedral angle defined by the post and beam. Reverse tension members 51 and 52 extend from the inner end of plate 46 along the inner surface of the post and the lower surface of the beam, respectively, being connected thereto by lag screws 53 or equivalent. In this form of the device the compression plates 49 and 50 also extend from the apex of the dihedral angle a sufficient distance to lie within the area taking up the compression load of the arch. The outer portions of the end surfaces of the post and the beam need not be accurately finished to fit closely against the plate 46 since the stresses in these portions are in tension, and are resisted by the lag screws and the outer, continuous tension strap. As in the previous modification, all operating surfaces of the connector lie in planes at right angles to the vertical when the arch is upright, hence the connector may be slid into position when the beam and post are in abutted relation on the ground in the relative positions they will occupy. As in the previous modification, all cutting of the beam and the post comprise straight sawcuts and there is no need for special welding tools or the like, and no necessity for turning the members or the arch over or otherwise manipulating one wooden member with respect to the other while the assembly of the arch is being accomplished.

Having illustrated and described preferred forms of the invention, it should be apparent to those skilled in the art that the same permits of modification in arrangement and detail. I claim as my invention all such modifications as come within the true spirit and scope of the appended claims.

I claim:

1. A rigid arch comprising an upright wooden post, a wooden beam extending laterally from the top of said post with the lower surface of said beam defining an inner dihedral angle with the inner surface of said post, a metal connector joining said beam to said post, said connector comprising a continuous tension strap having an upright portion extending longitudinally of the outer surface of said post and a lateral portion extending longitudinally of the upper surface of said beam, means fastening said upright portion to said post and said lateral portion to said beam, and compression absorbing means, lying between and against the upper end surface of the post and the adjacent end surface of the beam for absorbing the compression load of the arch, said compression absorbing means comprising a pair of compression plates extending from side to side of the beam and the post and disposed at an acute dihedral angle with respect to each other, one of said compression plates extending outwardly from the apex of said inner dihedral angle and lying in a transverse plane with respect to the longitudinal axis of the post, and the other of said compression plates extending upwardly from the apex of said inner dihedral angle and lying in a transverse plane with respect to the longitudinal axis of the beam.

2. A rigid arch comprising an upright wooden post, a wooden beam extending laterally from the top of said post with the lower surface of said beam defining an inner dihedral angle with the inner surface of said post, a metal connector joining said beam to said post, said connector comprising a continuous tension strap having an upright portion extending longitudinally of the outer surface of said post and a lateral portion extending longitudinally of the upper surface of said beam, means fastening said upright portion to said post and said lateral portion of said beam, compression absorbing means integrally fixed to said tension strap and lying between and against the upper end surface of the post and the adjacent end surface of the beam for absorbing the compression load of the arch, said compression absorbing means comprising a pair of compression plates extending from side to side of the beam and the post and disposed at an acute dihedral angle with respect to each other, one of said compression plates extending outwardly from the apex of said inner dihedral angle and lying in a transverse plane with respect to the longitudinal axis of the post, and the other of said compression plates extending upwardly from the apex of said inner dihedral angle and lying in a transverse plane with respect to the longitudinal axis of the beam.

3. A rigid arch comprising an upright wooden post, a wooden beam extending laterally from the top of said post with the lower surface of said beam defining an inner dihedral angle with the inner surface of said post, a metal connector joining said beam to said post, said connector comprising a continuous tension strap having an upright portion extending longitudinally of the outer surface of said post and a lateral portion extending longitudinally of the upper surface of said beam, means fastening said upright portion to said post and said lateral portion to said beam, compression absorbing means integrally fixed to said tension strap and lying between and against the upper end surface of the post and the adjacent end surface of the beam for absorbing the compression load of the arch, said compression absorbing means comprising a pair of compression plates extending from side to side of the beam and the post and disposed at an acute dihedral angle with respect to each other, one of said compression plates extending outwardly from the apex of said inner dihedral angle and lying in a transverse plane with respect to the longitudinal axis of the post, and the other of said compression plates extending upwardly from the apex of said inner dihedral angle and lying in a transverse plane with respect to the longitudinal axis of the beam, divergent reverse tension members welded to the inner ends of said compression plates and lying respectively against the inner surface of said beam and the lower surface of said post, and means respectively fastening said reverse tension members to said post and said beam.

4. A rigid arch comprising an upright wooden post, a wooden beam extending laterally from the top of said post with the lower surface of said beam defining an inner dihedral angle with the inner surface of said post, a metal connector joining said beam to said post, said connector comprising a continuous tension strap having an upright portion extending longitudinally of the outer surface of said post and a lateral portion extending longitudinally of the upper surface of said beam, means fastening said upright portion to said post and said lateral portion to said beam, and compression absorbing means, lying between and against the upper end surface of the post and the adjacent end surface of the beam for absorbing the compression load of the arch, said compression absorbing means comprising a pair of compression plates extending from side to side of the beam and the post and disposed at an acute dihedral angle with respect to each other, one of said compression plates extending outwardly from the apex of said inner dihedral angle and lying in a transverse plane with respect to the longitudinal axis of the post, and the other of said compression plates extending upwardly from the apex of said inner dihedral angle and lying in a transverse plane with respect to the longitudinal axis of the beam, and a compression pad plate affixed to said compression plates, dividing the dihedral angle therebetween and abutting said tension strap in the angle between said upright and lateral portions thereof.

5. A rigid arch comprising an upright wooden post, a wooden beam extending laterally from the top of said post with the lower surface of said beam defining an inner dihedral angle with the inner surface of said post, a metal connector joining said beam to said post, said connector comprising a continuous tension strap having an upright portion extending longitudinally of the outer surface of said post and a lateral portion extending longitudinally of the upper surface of said beam, means fastening said upright portion to said post and said lateral portion to said beam, and compression absorbing means, lying between and against the upper end surface of the post and the adjacent end surface of the beam for absorbing the compression load of the arch, said compression absorbing means comprising a pair of compression plates extending from side to side of the beam and the post and disposed at an acute dihedral angle with respect to each other, one of said compression plates extending outwardly from the apex of said inner dihedral angle and lying in a transverse plane with respect to the longitudinal axis of the post, and the other of said compression plates extending upwardly from the apex of said inner dihedral angle and lying in a transverse plane with respect to the longitudinal axis of the beam, and a compression pad plate affixed to said compression plates, dividing the dihedral angle therebetween and abutting said tension strap in the angle between said upright and lateral portions thereof, and a rounded bar affixed to said compression pad plate along the outer end edge thereof.

6. A rigid arch comprising an upright wooden post, a wooden beam extending laterally from the top of said post with the lower surface of said beam defining an inner dihedral angle with the inner surface of said post, a metal connector joining said beam to said post, said connector comprising a continuous tension strap having an upright portion extending longitudinally of the outer surface of said post and a lateral portion extending longitudinally of the upper surface of said beam, means fastening said upright portion to said post and said lateral portion to said beam, and compression absorbing means integrally fixed to said tension strap and lying between and against the upper end surface of the post and the adjacent end surface of the beam for absorbing the compression load of the arch comprising a pair of compression plates extending from side to side of the beam and the post and disposed at an acute dihedral angle with respect to each other, one of said compression plates extending outwardly from the apex of said inner dihedral angle and lying in a transverse plane with respect to the longitudinal axis of the post, and the other of said compression plates extending upwardly from the apex of said inner dihedral angle and lying in a transverse plane with respect to the longitudinal axis of the beam, said compression absorbing means also comprising a third plate substantially bisecting the angle defined by said upright portion of the tension strap and said lateral portion of the tension strap, and said compression plates each comprising one leg of an angle bar welded to the inner end of said third plate along the lateral edge of both of its legs.

References Cited in the file of this patent

UNITED STATES PATENTS

| | | |
|---|---|---|
| 1,143,697 | Gallant et al. | June 22, 1915 |
| 2,653,360 | Woodworth | Sept. 29, 1953 |